June 25, 1940.  G. V. MABRITO  2,205,889

AUTOMATIC BRAKE ADJUSTMENT

Filed April 20, 1938

Guido V. Mabrito,
INVENTOR

BY Victor J. Evans & Co.
HIS ATTORNEYS

Patented June 25, 1940

2,205,889

UNITED STATES PATENT OFFICE 2,205,889

AUTOMATIC BRAKE ADJUSTMENT

Guido V. Mabrito, Chicago, Ill.

Application April 20, 1938, Serial No. 203,193

1 Claim. (Cl. 188—79.5)

My invention relates to automotive vehicle brakes and includes among its objects and advantages the provision of improved means for maintaining normal clearance between the brake shoes and brake drum. The invention is so designed as to automatically compensate wear on the brake shoes or linings.

Figure 2:
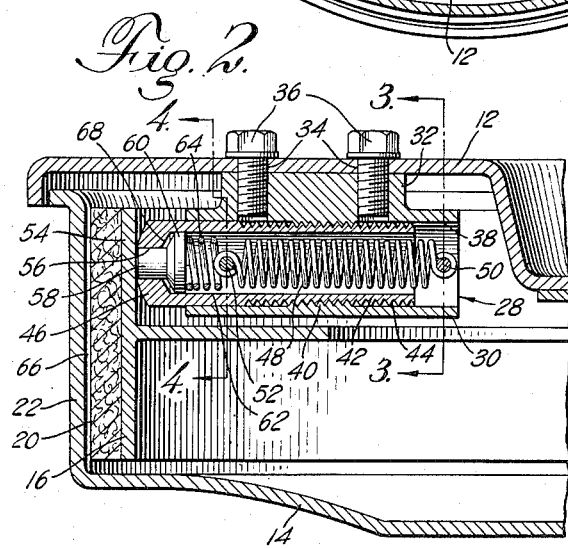
Fig. 2 is an enlarged sectional view along the line 2—2 of Fig. 1.
Figure 3:
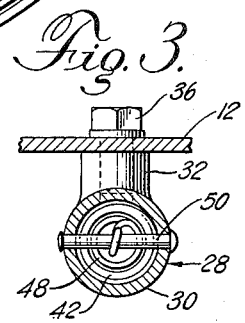
Fig. 3 is a sectional view along the line 3—3 of Fig. 2.
Figure 4:
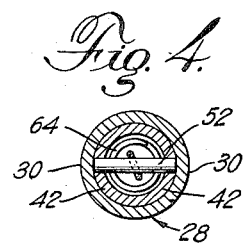
Fig. 4 is a sectional view along the line 4—4 of Fig. 2.

In the embodiment selected to illustrate my invention, I make use of a brake structure 10 which may be of the conventional type employed in automobiles. Specifically, the brake 10 comprises the usual anchor plate 12 and brake drum 14. Two brake shoes 16 are pivotally connected at 18 with the anchor plate 12. Each shoe is provided with the usual brake lining 20 which may be brought into braking relation with the flange 22 of the drum 14 through outward pivotal movement of the brake shoes 16. Fig. 2 illustrates a conventional hydraulic cylinder 24 which is operatively connected with the brake shoes 16 in the usual manner. A conventional tension spring 26 interconnects the brake shoes 16 for yieldingly holding the latter in the normal positions of Fig. 2. The structure so far described is old and well known in the art and need not be described in further detail.

Figure 1:
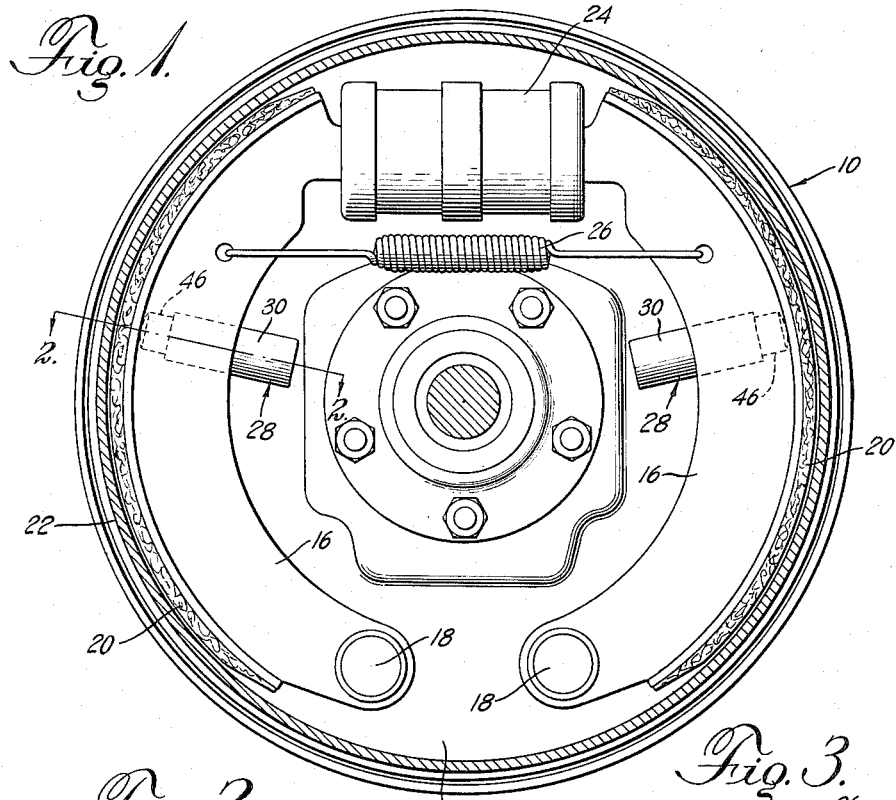
Fig. 1 is an elevational view of a conventional automobile brake showing my invention applied thereto with certain parts of the brake structure removed for the sake of clearness.

In Fig. 1, I illustrate two wear compensating units 28 as being mounted on the anchor plate 12. Both units are identical in construction so that the description of one will apply to both. In Fig. 2, the unit 28 comprises a tubular body 30 or guide having a boss 32 abutting the anchor plate 12. The anchor plate is provided with two openings 34 for the reception of bolts 36 threaded into the boss 32 for fixedly connecting the body 30 with the anchor plate 12. I provide the body 30 with a cylindrical bore 38 provided with internal threads 40. A sleeve 42 lies within the body 30 and is provided with external threads 44 having threaded relation with the threads 40.

Sleeve 42 while fitting snugly inside the body 30 rotates freely inside the bore 38 and has its end 46 extending beyond one end of the body. One end of a torsion spring 48 is anchored to a pin 50 fixedly connected with the body 30 while the opposite end of the spring is anchored to a pin 52 fixedly connected with the sleeve 42. With the parts adjusted according to Fig. 2, the spring 48 is under such tension as to rotate the sleeve 42 unless resisting forces are applied thereto. The spring is twisted in such manner as to rotate the sleeve 42 in a direction which causes the end 46 to advance toward the brake shoe 16. Fig. 2 illustrates the end 46 as being arranged in pressure relation with the flange 54 of the brake shoe 16, which pressure relation is such as to restrain the sleeve 42 from relative rotation with respect to the body 30.

End 46 of the sleeve 42 includes a bore 56 which slidably receives a pin 58 formed integrally with a head 60 slidably related to the bore 62 of the sleeve 42. A compression spring 64 is interposed between the head 60 and the pin 52 for urging the head in the direction of the end 46 of the sleeve 42. Under the condition illustrated in Fig. 2, the outer end of the pin 58 lies in pressure relation with the flange 54 of the brake shoe.

In operation, the flanges 54 of the brake shoes normally lie in pressure relation with the ends 46 of the sleeves 42 because of the spring 26. At this time, the pins 58 are depressed so that the heads 60 are in spaced relation with the inner faces of the ends 46. Fig. 2 illustrates the normal brake clearance at 66 with the clearance 68 between the head 60 and the inner face of the end 46 of the same proportion as the brake clearance. Movement of the brake shoes 16 into braking relation with the flange 22 of the brake drum moves the flanges 54 out of pressure relation with the ends 46, but the pins 58 will advance to hold their ends in pressure relation with the flanges because of the compression spring 64.

Referring to Fig. 2, the clearance 68 is sufficient to maintain the pin 58 in pressure relation with the flange 54 so long as the brake clearance 66 remains normal. Such pressure relation is sufficient to resist relative rotation of the sleeve 42 which is responsive to the torsional forces of the spring 48 in the absence of restraining forces. As the brake lining 20 wears, the brake shoe 16 will be pivoted in a greater degree about its axis 18. The clearance 68 is limited in such a degree as to bring the head 60 into pressure relation with the end 46 upon slight wear of the brake lining. Pressure relation between the head 60 and the end 46 negatives the pressure relation between the pin 58 and the flange 54, which, in turn, negatives normal forces which prevent relative rotation of the sleeve 42. Under such conditions, the spring 48 will rotate the sleeve 42 sufficiently far to maintain the end of the pin 58 in pressure relation with the flange 54 thereby automatically adjusting the sleeve in such manner as to maintain normal clearance.

In my invention, the units 28 are completely independent of each other so that each brake shoe will be independently adjusted to maintain normal brake clearance as that shoe wears. The wear compensating units are entirely automatic in their operation and are effective for maintaining normal brake clearance within a large range of wear on the brake lining. The units are so designed as to be readily applicable to brakes of conventional design.

Without further elaboration, the foregoing will so fully explain my invention that others may, by applying current knowledge, readily adapt the same for use under various conditions of service.

I claim:

In a brake mechanism including a supporting anchor plate, a brake drum, a brake shoe carried on the anchor plate for movement into and out of braking engagement with the drum, and means for actuating the shoe; a guide member secured rigidly to the anchor plate with its guideway in substantially radial relation to the drum, a sleeve of substantial length in proportion to its diameter having a portion fitted in guiding relation to the end of the guideway adjacent the brake drum, said guideway having a threaded portion spaced inwardly from said end, said sleeve having a portion threaded for engagement with said threaded portion of the guideway, a plunger projecting from the end of the sleeve for contact with the brake shoe, stop means within the sleeve limiting such projection of the plunger, a spring within the sleeve urging the plunger into projected position, a torsion spring in the sleeve, a cross-pin in the sleeve to which one end of the torsion spring is anchored and against which the plunger spring reacts for projecting the plunger, and a second cross-pin by which the opposite end of the torsion spring is anchored in the guide member at the end remote from the brake shoe whereby said spring serves to rotate the sleeve and advance it toward the brake shoe when the brake clearance exceeds the limit of projection of the plunger.

GUIDO V. MABRITO.